US008646104B2

(12) United States Patent
Schneider

(10) Patent No.: US 8,646,104 B2
(45) Date of Patent: Feb. 4, 2014

(54) STATELESS CHALLENGE-RESPONSE BROADCAST PROTOCOL

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1400 days.

(21) Appl. No.: 12/072,884

(22) Filed: Feb. 27, 2008

(65) Prior Publication Data
US 2009/0217386 A1  Aug. 27, 2009

(51) Int. Cl.
*G06F 21/10* (2013.01)

(52) U.S. Cl.
USPC ............................................ 726/30; 380/255

(58) Field of Classification Search
USPC ............ 726/4–6, 18–19, 21, 26, 30; 709/201–203, 206–207, 224, 227, 238; 455/3.01, 410, 411, 412.1, 466; 725/32; 719/313, 314; 380/1, 232, 255, 380/277, 285, 28–30
See application file for complete search history.

(56) References Cited

U.S. PATENT DOCUMENTS

| | | | |
|---|---|---|---|
| 6,377,691 B1 | 4/2002 | Swift et al. | |
| 6,760,763 B2 * | 7/2004 | Jennings et al. | 709/224 |
| 7,398,091 B2 * | 7/2008 | Chen | 455/454 |
| RE40,708 E * | 5/2009 | Dondeti et al. | 713/163 |
| 7,669,235 B2 * | 2/2010 | Hunt et al. | 726/18 |
| 7,694,335 B1 | 4/2010 | Turner et al. | |
| 7,769,177 B2 * | 8/2010 | Son et al. | 380/281 |
| 7,793,112 B2 * | 9/2010 | Carpentier et al. | 713/190 |
| 7,818,401 B2 * | 10/2010 | Makofka | 709/219 |

OTHER PUBLICATIONS

Lam, K-Y. et al. "Timely Authentication in Distributed Systems," Interprocess Communications, pp. 293-303.
Proudler, G.J. "Security for a Connectionless Peer-to-Peer Link," Hewlett-Packard Company, Jun. 1966, 1-6.
Anonymous. "Security," the Open Group, 1997, located at <http://www.atc.uniovi.es/inf_superior/atc/DISTRIBUIDAS/Otro_Material/DCERPC/chap13...>, downloaded on Nov. 13, 2010, pp. 1-15.
Non-final Office Action issued for U.S. Appl. No. 11/977,867, mailed Nov. 9, 2010, 6 pages.
Final Office Action issued for U.S. Appl. No. 11/977,867, mailed Apr. 27, 2011, 6 pages.
Notice of Allowance issued for U.S. Appl. No. 11/977,867, mailed Oct. 4, 2011, 7 pages.

* cited by examiner

*Primary Examiner* — Joseph P. Hirl
*Assistant Examiner* — Leynna Truvan
(74) *Attorney, Agent, or Firm* — Lowenstein Sandler LLP

(57) ABSTRACT

A broadcast stateless protocol by which a client broadcasts a request to a server group is described. In one embodiment, the client broadcasts the request to a server group. A tamper-evident challenge including the request is received from any one server of the server group. A response to the tamper-evident challenge is broadcast to any one server of the server group, the response including the request. A result to the request is received upon any one server of the server group verifying the response being valid and the request being unmodified.

20 Claims, 13 Drawing Sheets

STATELESS CHALLENGE-RESPONSE BROADCAST PROTOCOL

CROSS-RELATED APPLICATIONS

The present application is related to U.S. patent application Ser. No. 11/977,867, filed on Oct. 26, 2007.

TECHNICAL FIELD

Embodiments of the present invention relate to computing systems, and more particularly, to computer communication protocols.

BACKGROUND

Many data processing operations include a communication component, where two (or more) systems interact to exchange data and control information. In some environments, these interactions can be anonymous: neither party knows anything about the other, beyond the other's network address (which is generally necessary for any communication to occur). An example of such anonymous interaction is the retrieval of an ordinary Web page: the client (browser) establishes a data connection to a server and requests a document, and the server returns it. (It is appreciated that the Hypertext Transfer Protocol, "HTTP," includes optional parameters and mechanisms by which a server can demand, and a client can provide, information about its identity.)

A variety of network protocols have been developed to serve in applications where the communicating parties need information from, or assurances about, each other. Some protocols are extremely flexible, providing options for each party to request, supply, or decline arbitrary categories of information, while others define simple, straightforward lock-step interactions that can be implemented even by devices with very little computational capacity. However, applications occasionally arise where existing protocols do not permit the establishment and conduct of communications with a desired combination of features. In these applications, a customized protocol may be useful.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for a broadcast stateless protocol is described. In one embodiment, the client broadcasts the request to a server group. A tamper-evident challenge including the request is received from any one server of the server group. A response to the tamper-evident challenge is broadcast to any one server of the server group, the response including the request. A result to the request is received upon any one server of the server group verifying the response being valid and the request being unmodified.

Figure 1:
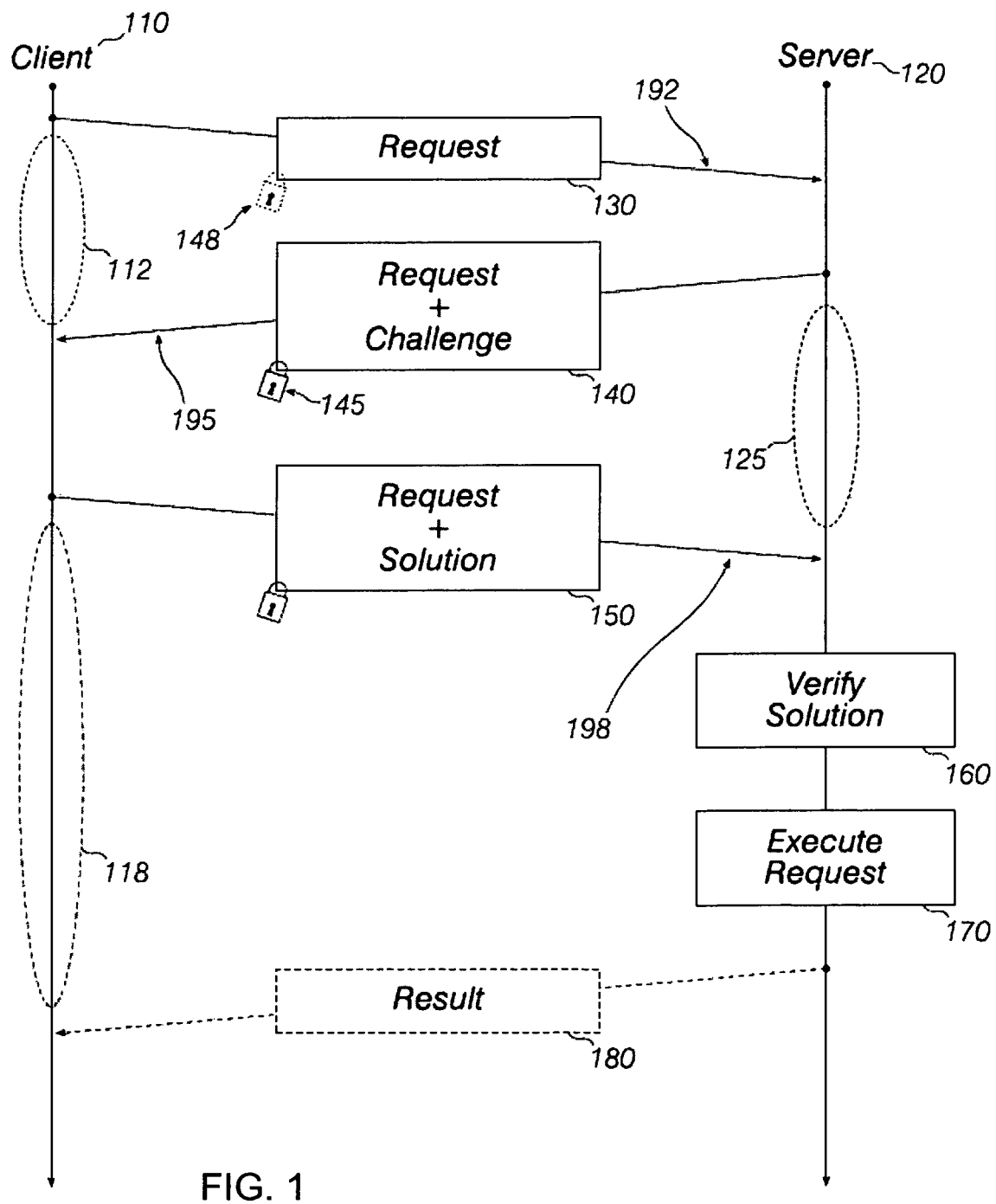
FIG. 1 is a block diagram illustrating an outline of messages transmitted between parties interacting according to one embodiment.

FIG. 1 outlines messages exchanged between two parties interacting according to an embodiment of the invention. For convenience, the parties are referred to as client 110 and server 120; the inventive protocol may be used when client 110 wishes to cause server 120 to take some action. First, client 110 transmits a request 130 to server 120. The request may or may not call for an eventual result message from server 120.

Upon receiving the request, server 120 prepares a challenge 140 containing the request and a puzzle that can only be solved by client 110 for which server 120 is willing to execute the request. The entire challenge is embedded in a tamper-resistant structure (indicated in this figure by lock 145) so that the server 120 can detect any modifications to the request or attempts by client 110 to circumvent the puzzle.

The tamper-resistant structure may be created by calculating a message authentication code ("MAC") over the structure, including at least the request and the puzzle. The MAC may be calculated using a secret key known only to the server, so only the server can verify the MAC. The puzzle may be an encrypted nonce (a pseudo-random number chosen in a way unpredictable to an attacker, or a true random number, preferably used only once) that an acceptable client can decrypt with a secret key it shares with the server, or the private half of a public-private keypair. The tamper-resistant feature (e.g. the MAC) may be combined with the puzzle. For example, the puzzle could be the MAC itself or a function of the MAC and a nonce, encrypted so that only an acceptable client can decrypt it. By solving the puzzle, the client might produce a MAC that the server could verify directly (the client, however, might not be able to verify it).

Client 110 receives the tamper-resistant challenge and may check to ensure that the request correctly describes what it wants server 120 to do. (The client may have made its initial request tamper-resistant also, as indicated by optional "dashed line" lock 148. A tamper-resistant request might include a MAC calculated based on a secret known only to the client. The client can validate such a MAC to ensure that the server, or an attacker intercepting the messages, did not change the request or submit a spurious request with a forged return address, even if the client has kept no state information about the request after sending the request 130.)

Client 110 solves the puzzle and returns a response 150 containing the request and the solution. Server 120 confirms that the solution is valid (160) and that the request has not been modified, and then executes the request (170). Finally, if the request calls for a reply, the reply 180 (e.g., containing the result of executing the request) is prepared and transmitted to client 110.

The protocol outlined with reference to FIG. 1 has several useful characteristics. First, it is truly stateless—neither the client nor the server need devote resources to remembering anything about its peer in the conversation during the time periods indicated at 112, 125 and 118. Any state information relating to the interaction accumulates in the messages that the parties exchange. Messages may be transmitted between client and server by a connectionless protocol such as the User Datagram Protocol ("UDP"). Thus, not even low-level system resources are consumed, as they would be, for example, if a connection-oriented protocol such as the Transmission Control Protocol ("TCP") was used. The use of UDP may also relieve resource pressure on network-infrastructure devices such as routers, switches, bridges and firewalls between the client and server. A TCP connection might require that these intermediate devices also store information to support client-server communication, but UDP packets are less likely to require such support. In another embodiment, several separate, short-lived TCP connections may be used instead of UDP packets. These TCP connections would involve the maintenance of some state information while they were active, but could otherwise be completely independent—the client could send its request one day, the server could send the challenge over a new connection the next day, and the client could provide the solution to the puzzle via a third connection the following day, even with intervening machine resets or reboots, and the protocol would complete successfully. Other network protocols, offering different combinations of reliability, security, and other inherent features, can also carry the messages of an embodiment of the invention between client and server. The Reliable User Datagram Protocol ("RUDP"), Reliable Datagram Protocol ("RDP"), Internetwork Packet Exchange ("IPX") protocol, and PARC Universal Protocol ("PUP") are all serviceable alternatives.

Several attack points are illustrated in FIG. 1; in addition, some general attacks will be discussed here. First, an attacker, which is assumed to have full access to and control of the communication channels, can record and replay messages, block messages, and substitute its own messages at will. Blocked messages will, of course, prevent the protocol from proceeding, but cannot cause the server to execute an attacker's chosen request. If the attacker intercepts request 130 at point 192 and substitutes its own request, server 120 will not notice, but client 110 may detect the substitution when server 120 returns the request/challenge message 140 (assuming that client 110 made its request 130 tamper-resistant, as discussed above). Even if request 130 is not tamper-resistant, client 110 may detect the substituted request if it is not a request the client would normally make. If the attacker switches out the client's true request at 192, but replaces the true request at 193, the client may not detect the attack, but the server will be able to determine that the client solved the challenge for a different request if the tamper-resistant challenge embeds information about the request.

An attacker can frustrate the protocol by blocking or tampering with the request/challenge message 140 at point 195, but it cannot modify the tamper-resistant request or insert a substitute challenge without detection, either by the client 110 or in the subsequent phase by the server 120. Similarly, message 150 can be blocked or damaged at point 198, but server 120 can detect and refuse an attempt to substitute an attacker's request for the client's request in message 150. Finally, if server 120 embeds a timestamp or serial number in the request/challenge message 140, the protocol is resistant to replay attacks where the attacker submits copies of the request/solution message 140 in hopes of causing the server to execute the request again and again.

Figure 2:
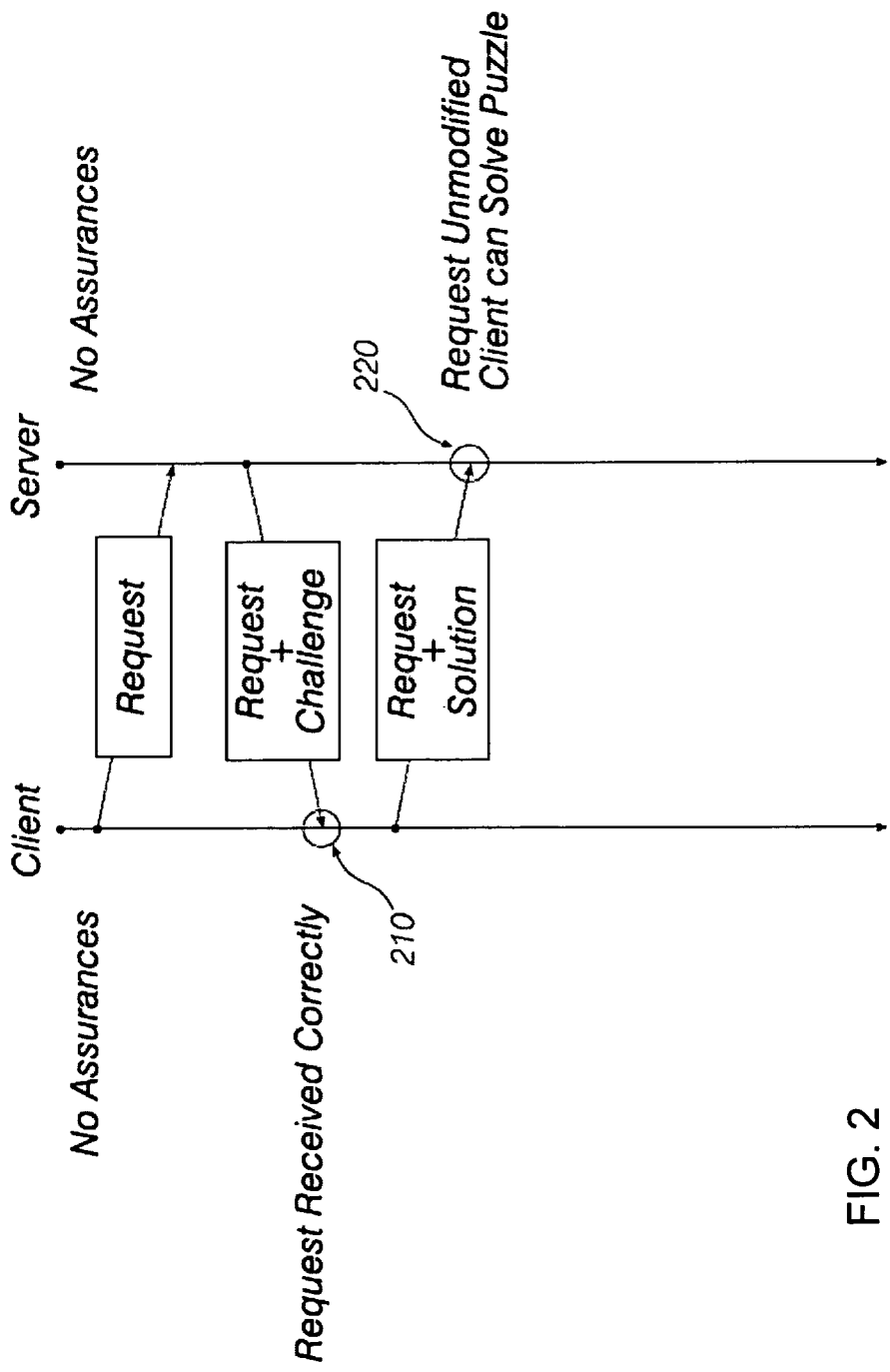
FIG. 2 is a block diagram illustrating one embodiment of a client and a server in a stateless challenge-response protocol.

A second useful characteristic is that the protocol provides data integrity, peer identification, and attack resistance in measures well-suited for a network-management application described below. FIG. 2 shows how the protocol gives increasingly strong assurances to the participants as their interaction continues. Before the first (request) message, neither party has any specific information about the other. However, in many environments, the parties will share a common secret; proving possession of the secret will occur later in the protocol. The request message does not change this situation: it gives no further assurances to either party (specifically, the client cannot be sure that the server received the request correctly, and the server cannot be sure that the request is from an acceptable client, as opposed to an impostor).

The tamper-resistant challenge sent from the server to the client provides an assurance 210 to the client that the server received the request correctly. This is because the tamper-resistant challenge contains a copy of the request. If the client used "fire and forget" to send the request, it may not have stored a copy of the request. Therefore, in some embodiments, the original request will be in a tamper-resistant structure, so that the client can verify that it must have made the request, though it has no present memory of doing so. A tamper-resistant request may include a message authentication code ("MAC") or a cryptographic signature that can be validated by using a secret key known only to the client. This optional validation can help thwart a denial-of-service attack where a stream of forged requests are sent to the server, which responds by sending tamper-resistant challenges to the client. The client can drop any challenges that correspond to requests it did not send.

The client responds to the tamper-resistant challenge by solving the puzzle contained therein and sending the solution to the server, assuring the server 220 that the request has not been modified and that the client is capable of solving the puzzle. Puzzles are discussed in greater detail below, but generally comprise an encrypted item that the client can decrypt with a key it possesses. The client's response to the tamper-resistant challenge provides two assurances to the server: first, that the client did not modify the request; and second, that the client was able to solve the puzzle. Embodiments of the invention are commonly deployed in environments where ability to solve a puzzle corresponds acceptably with identity. That is, the server is willing to extend trust to a communication partner that can solve the puzzle, by executing the request made by the partner.

After executing the request, the server may have a result to report to the client. This result may include a secure identifier to permit the client to confirm that the result corresponds to a request that the client made earlier. The secure identifier thwarts an attack where, for example, the client wishes to monitor the continued functionality of the server: an attacker cannot simply spoof or replay "Alive" or "OK" messages from the server after incapacitating the server, because the spoofed messages would not have valid secure identifiers.

In one embodiment, a puzzle is a computational task that is simple to perform with knowledge of a secret, and infeasible without such knowledge. Puzzles usually have a cryptographic or number-theoretic basis. For example, one puzzle may be an encrypted string, which can be decrypted only with the appropriate key. Another puzzle may be a large integer, that can only be factored quickly if the solver knows a (secret) prime factor. In an embodiment of the invention, the server sends a tamper-resistant challenge containing a puzzle to the client. If the client can solve the puzzle (and prove this ability by sending the solution in a response to the challenge), the server is assured that the client knows the secret.

A server may produce puzzles by encrypting a string or bit sequence known only to the server, with a key known to the client. To avoid succumbing to replay attacks, where the attacker eavesdrops to obtain the client's solution and then attempts to present the same solution with other requests, the server may embed a time of day, a sequence (serial) number, or a digest ("hash," message authentication code or "MAC") of the request in the encrypted string. The solution to such a puzzle can only be used with the request to which it corresponds.

Note that a party to this protocol should not encrypt or decrypt any arbitrary string that is presented—doing so may provide an avenue for an attacker to obtain information about the secret key. Thus, when the client solves the puzzle, it may return the solution re-encrypted or convolved with a number of the client's own choosing. This technique allows the client to prove that it was able to solve the puzzle, without disclosing to an eavesdropper exactly what the solution was.

One of the advantages of protocols according to embodiments of the invention is that they are stateless: neither party needs to retain any information about the other party to complete the protocol. One key to achieving statelessness is making protocol messages tamper-resistant. A message is tamper-resistant if the reply to the message permits the sender to verify that the other party received the message correctly, and did not modify it in the reply. This quality may also be described as "tamper evident:" any modification of the message can be detected reliably. One may think of the messages exchanged according to an embodiment of the invention as carrying the state back and forth between the parties so that neither party need store the information locally. Tamper resistance prevents one party from changing the state without the knowledge of the other party.

Some embodiments of the invention may embed a cryptographic hash of critical state information in the message. For example, the client may append a hash of its request to the request, so that it can tell if the server changes the request in producing the tamper-resistant challenge. (An ordinary hash is inadequate for this purpose: if there is no secret component to the hash, an attacker could simply change the message and re-compute the hash. A tamper-resistant message must involve or incorporate some secret information so that an attacker cannot change the message undetectably.) Similarly, the tamper-resistant challenge permits the server to tell if the client attempts to change its request when it provides the solution to the challenge. Tamper-resistance can stop a man-in-the-middle ("MITM") attack: the MITM can intercept messages in both directions and replace them with its own messages, but it cannot trick the server into executing a command different from the client's actual command, nor trick the client into solving a puzzle corresponding to a malicious command that the attacker would like to present to the server.

In another embodiment of the invention, a client and server may use shared or complementary secrets to encrypt the messages they exchange. Such encryption may provide secrecy from an eavesdropper, in addition to the resistance against MITM attacks of a plaintext embodiment.

In a broadcast network where the clients broadcast their request, and any interested servers broadcast a challenge, one can achieve anonymous, distributed authentication. The only requirement would be that any client/server pair would need to be able to generate a mutual secret (by using Diffie-Hellman, for example). In this context, anonymous would mean that only the communicating client and server would know who the other one is, but nobody else listening to the broadcasts would know from the broadcasts themselves (although the underlying communications protocol may provide that information).

The public parameters required to generate the shared secret would themselves become the authentication tokens. They can either be stored in secure storage (perhaps associated with a list of authorized requests or other attributes), or signed in some fashion (for example, every actor willing to accept a particular DH can provide a MAC for it, which the owner can provide later), or perhaps authenticated with an external server of some kind.

Figure 3:
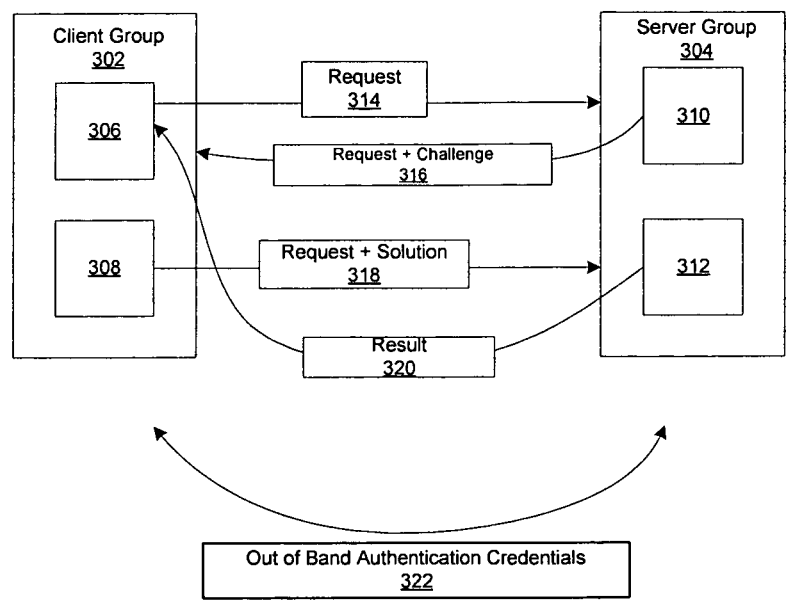
FIG. 3 is a block diagram illustrating one embodiment of a group of clients and a group of servers in a stateless challenge-response broadcast protocol.

FIG. 3 is a block diagram illustrating an example of a group of clients and a group of servers in a stateless challenge-response broadcast protocol. Client group 302 includes one or more clients 306, 308. Server group 304 includes one or more servers 310, 312. Client 306 broadcasts a request 314 to server group 304. An interested server 310 transmits a challenge 316 that includes request 314 to client group 302. Another client from client group 302 may reply to challenge 316. For example, client 308 generates and sends a solution 318 to challenge 316 to server group 304. Solution 318 may also include request 314. Another server 312 from server group 304 may verify solution 318, execute request 314, and send result 320 to client 306 which originally submitted request 314. Public parameters 322 may be shared between client group 302 and server group 304 out of band.

Figure 4:
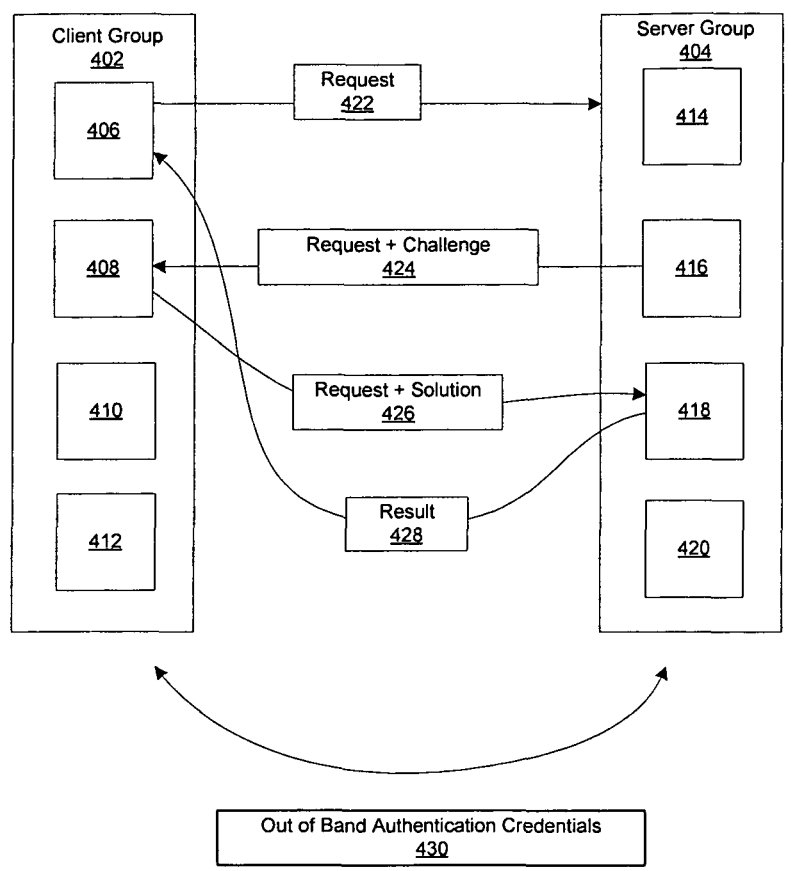
FIG. 4 is a block diagram illustrating another embodiment of a group of clients and a group of servers in a stateless challenge-response broadcast protocol.

FIG. 4 is a block diagram illustrating another embodiment of a group of clients and a group of servers in a stateless challenge-response broadcast protocol. Client group 402 includes one or more clients 406, 408, 410, and 412. Server group 404 includes one or more servers 414, 416, 418, and 420. Client 406 broadcasts a request 422 to server group 404. Any interested server of server group 404, for example server 416, transmits a challenge 424 that includes request 422 to a client, such as client 408, of client group 402. Another client from client group 402 may reply to challenge 424. For example, client 410 generates and sends a solution 426 to challenge 424 to server group 418. Solution 426 may also include request 422. Another server 420 from server group 404 may verify solution 426, execute request 422, and send result 428 to client 406 which originally submitted request 422. Public parameters 430 may be shared between client group 302 and server group 304 out of band.

Figure 5:
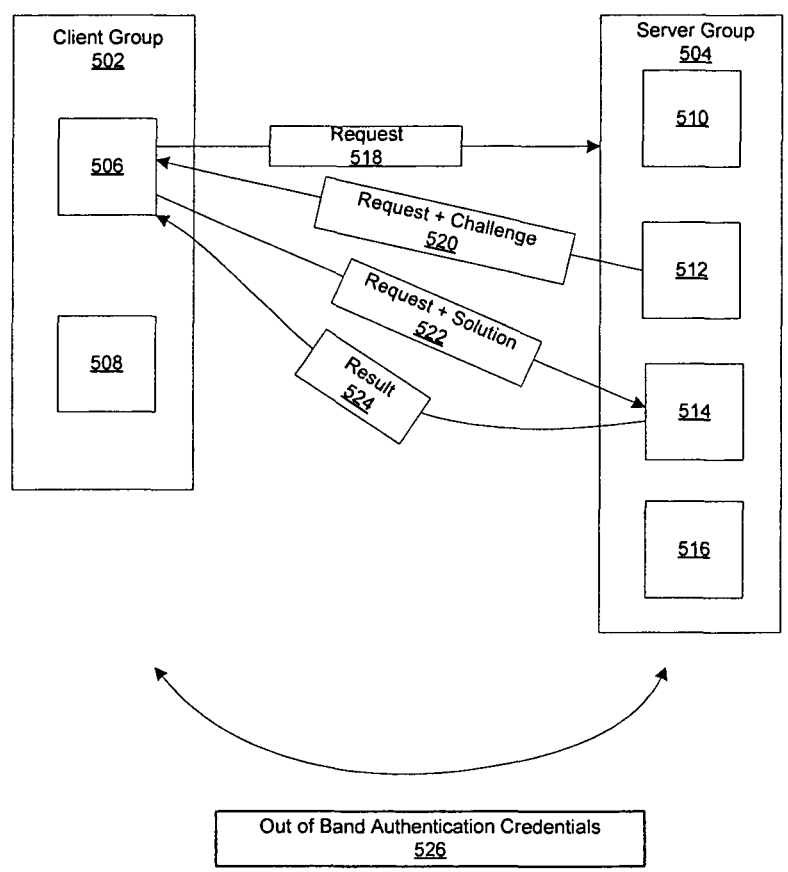
FIG. 5 is a block diagram illustrating another embodiment of a group of clients and a group of servers in a stateless challenge-response broadcast protocol.

FIG. 5 is a block diagram illustrating another embodiment of a group of clients and a group of servers in a stateless challenge-response broadcast protocol. Client group 502 includes one or more clients 506, 508. Server group 404 includes one or more servers 510, 512, 514, 516. Client 506 broadcasts a request 518 to server group 504. Any interested server of server group 504, for example server 512, transmits a challenge 520 that includes request 518 to client 506. Client 506 may reply to challenge 520 by generating and sending a solution 522 to challenge 520 to another server 514. Solution 522 may also include request 422. Another server 516 may verify solution 522, execute request 518, and send result 524 to client 506 which originally submitted request 518. Public parameters 526 may be shared between client group 502 and server group 504 out of band.

Figure 6:
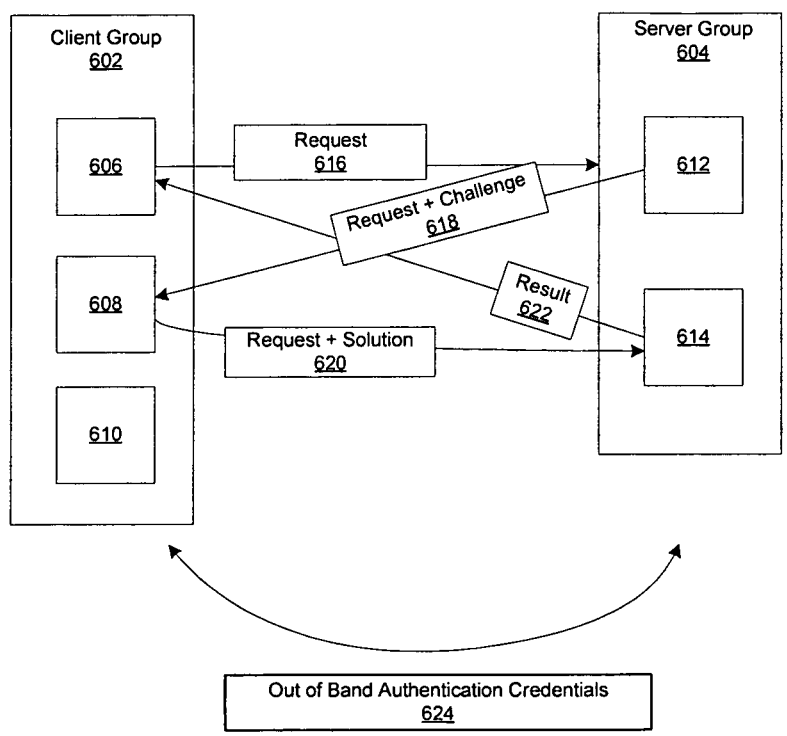
FIG. 6 is a block diagram illustrating another embodiment of a group of clients and a group of servers in a stateless challenge-response broadcast protocol.

FIG. 6 is a block diagram illustrating another embodiment of a group of clients and a group of servers in a stateless challenge-response broadcast protocol. Client group 602 includes one or more clients 606, 608, and 610. Server group 604 includes one or more servers 612, and 614. Client 606 broadcasts a request 616 to server group 604. Any interested server of server group 604, for example server 612, transmits a challenge 618 that includes request 616 to any client of client group 602, such as client 608. Another client from client group 610 may reply to challenge 618. For example, client 610 generates and sends a solution 620 to challenge 618 to server 612. Solution 620 may also include request 616. Another server 614 from server group 404 may verify solution 620, execute request 616, and send result 622 to client 606 which originally submitted request 616. Public parameters 430 may be shared between client group 302 and server group 304 out of band.

Providing the shared secret public parameters directly in a request could destroy anonymity. If the protocol is being used primarily to provide its broadcast feature, this may not be an issue. If anonymity is important, there are a few ways to mitigate the problem as illustrated in FIGS. 7 and 8.

Figure 7:
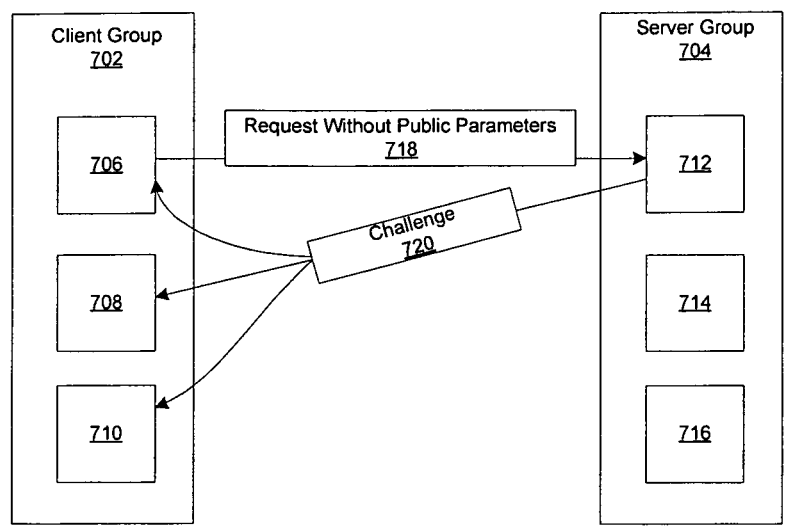
FIG. 7 is a block diagram illustrating one embodiment of a group of clients and a group of servers in a stateless challenge-response broadcast protocol without public parameters.
Figure 8:
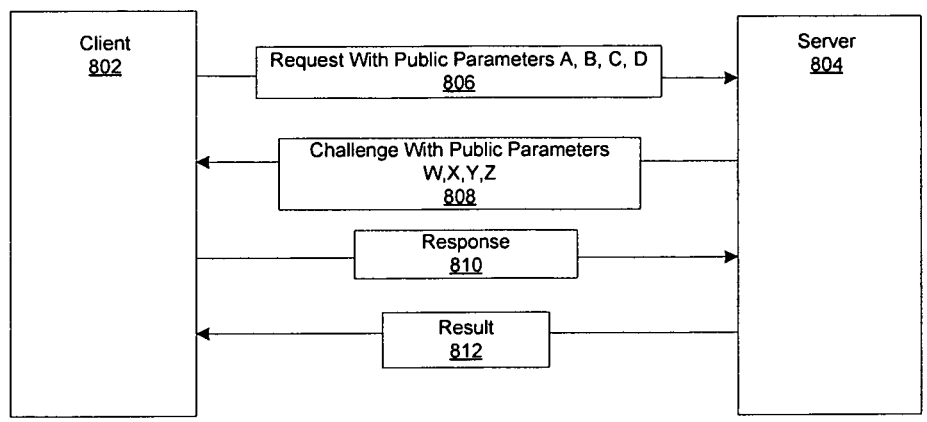
FIG. 8 is a block diagram illustrating one embodiment of a group of clients and a group of servers in a stateless challenge-response broadcast protocol with public parameters.

If there are few systems on the network, the request can omit the public parameter, and the server(s) responding would generate a challenge for every possible client as illustrated in FIG. 7. A client group 702 includes one or more clients 706, 708, and 710. A server group 704 includes one or more servers 712, 714, and 716. Client 706 broadcasts a request 718 to server group 704. Request 718 is broadcast without public parameters. A server of server group 704, for example server 712, transmits a challenge 720 that includes request 716 to all clients 706, 708, 710 of client group 702.

If every system has access to all (or a large fraction) of the public parameters that are valid on the network, the client can attach its own and several other public parameters at random to the request. The responding server(s) would generate challenges for each public parameter in the request, and attach a random selection of public parameters with its own. The response itself would be the list of answers the client would generate, based on each different public parameter associated with the challenge. FIG. 8 illustrates an example of such protocol. Client 802 wants to send a request. It generates the request 806 and sends public parameters A, B, C, and D (corresponding to its own public parameter and those for systems. Server 804 is able to accept the request and generates the shared secrets zA, zB, zC, and zD, based on its secret parameter z and the public parameters A, B, C, and D received with the request. Server 804 also generates a challenge 808 for each, and attaches the set of challenges and the public parameters W, X, Y, and Z. Client 802 receives challenges 808, and generates the shared secrets aW, aX, aY, and aZ. If the challenges are tagged with their associated public parameter, it provides responses 810 to the one challenge it recognizes as its own, one for each shared secret. If not, it provides a set of responses 810 for each challenge. Server 804 validates that one response actually solves a challenge and sends a result 812. The challenge associated with the response 810 will enable the server to determine which client sent the original request (or at least, which public parameter is associated with a particular request).

In another embodiment, each system is provided with a large set of private-public parameters. Each set of private-public parameters may be used in rotation.

Figure 9:
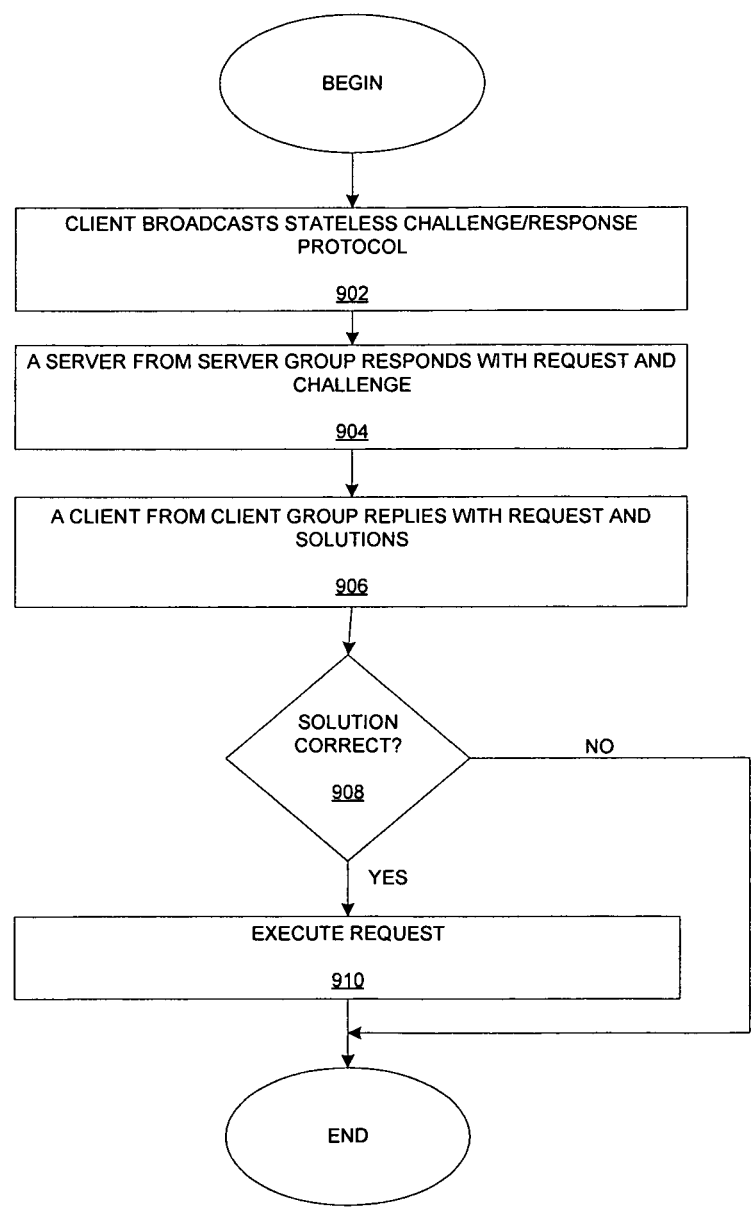
FIG. 9 is a flow diagram illustrating one embodiment of operations.

FIG. 9 is a flow diagram illustrating one embodiment of operations. At 902, a client of a client group broadcasts a request using a stateless challenge/response protocol to a server group. At 904, any interested server of the server group responds with a challenge. The challenge may also include the original request. At 906, any client from the client group replies with a solution/response to the challenge. The solution/response may also include the original request. At 908, a server from the server group determines whether the solution/response is correct. At 910, if the solution/response is correct, the server executes the request and sends the results back to the originally requesting client.

Figure 10:
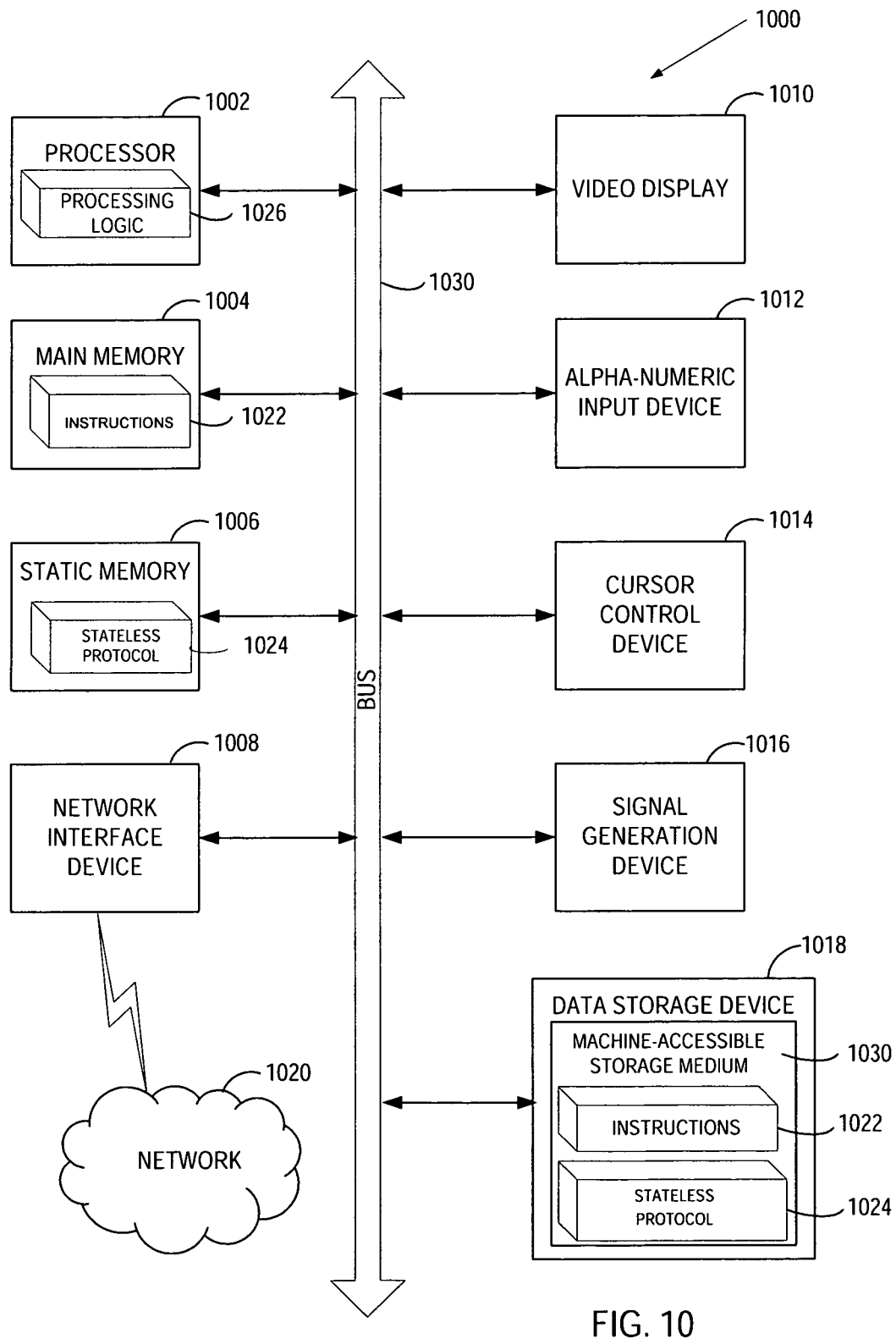
FIG. 10 is a block diagram illustrating an example of a computer system.

FIG. 10 illustrates a diagrammatic representation of a machine in the exemplary form of a computer system 1000 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1000 includes a processing device 1002, a main memory 1004 (e.g., read-only memory (ROM), flash memory, dynamic random access memory (DRAM) such as synchronous DRAM (SDRAM), a static memory 1006 (e.g., flash memory, static random access memory (SRAM), etc.), and a data storage device 1018, which communicate with each other via a bus 1030.

Processing device 1002 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 is configured to execute the processing logic 1026 for performing the operations and steps discussed herein.

The computer system 1000 may further include a network interface device 1008. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

The data storage device 1018 may include a machine-accessible storage medium 1030 on which is stored one or more sets of instructions (e.g., software 1022) embodying any one or more of the methodologies or functions described herein. The software 1022 may also reside, completely or at least partially, within the main memory 1004 and/or within the processing device 1002 during execution thereof by the computer system 1000, the main memory 1004 and the processing device 1002 also constituting machine-accessible storage media. The software 1022 may further be transmitted or received over a network 1020 via the network interface device 1008.

The machine-accessible storage medium 1030 may also be used to store a stateless protocol 1024 as presently described.

The stateless protocol 1024 may also be stored in other sections of computer system 1000, such as static memory 1006.

While the machine-accessible storage medium 1030 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Figure 11:
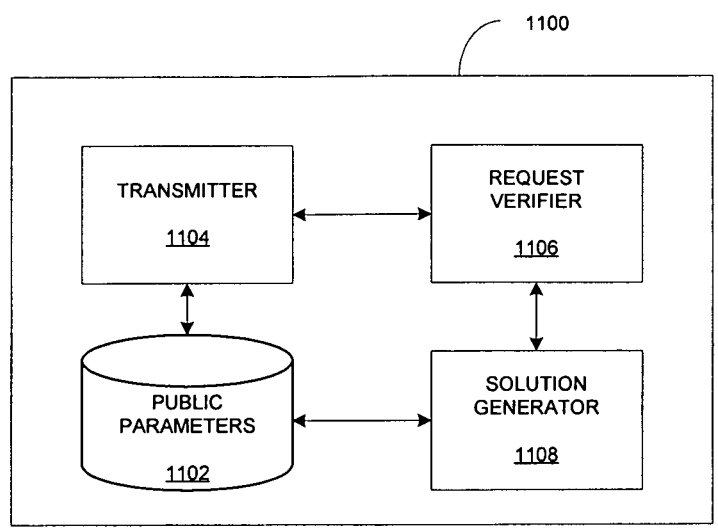
FIG. 11 is a block diagram of one embodiment of a client.

FIG. 11 is a block diagram of one embodiment of a client 1100. Client 1100 may include a public parameters storage 1102, a transmitter 1104, a request verifier 1106, and a solution generator 1108. Public parameter storage 1102 includes public parameters shared with a client group and a server group. Transmitter 1104 broadcasts a request to server group. Request verifier 1106 receives a tamper-evident challenge including the request from any one server of the server group at any one client of the client group. Solution generator 1108 broadcasts a response to the tamper-evident challenge to any one server of the server group. The response includes the request. The client receives a result to the request upon any one server of the server group verifying the response being valid and the request being unmodified.

Figure 12:
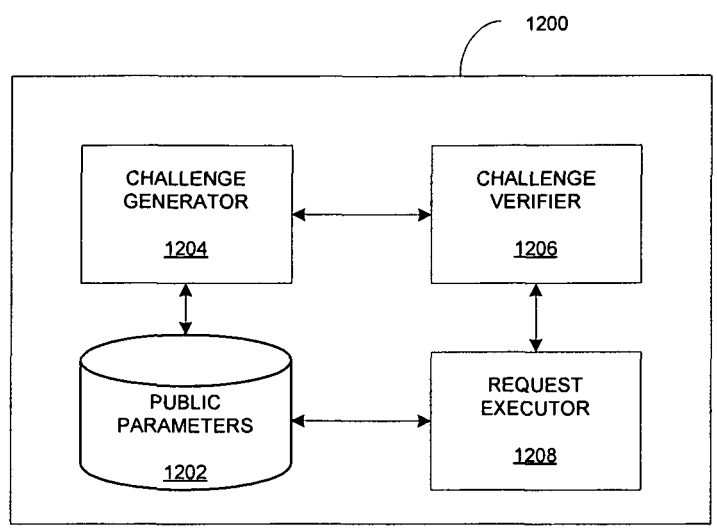
FIG. 12 is a block diagram of one embodiment of a server.

FIG. 12 is a block diagram of one embodiment of a server 1200. Server 1200 may include a public parameters storage 1202, a challenge generator 1204, a challenge verifier 1206, and a request executor 1208. Public parameters storage 1202 includes public parameters shared with a client group and a server group. Challenge generator 1204 receives a request from a client of the client group at the server, and generates a tamper-evident challenge including the request to any one client of the client group. Challenge verifier 1206 receives and verifies a response to the tamper-evident challenge. Request executor 1208 performs the request upon any one server of the server group verifying the response being valid and the request being unmodified.

Figure 13:
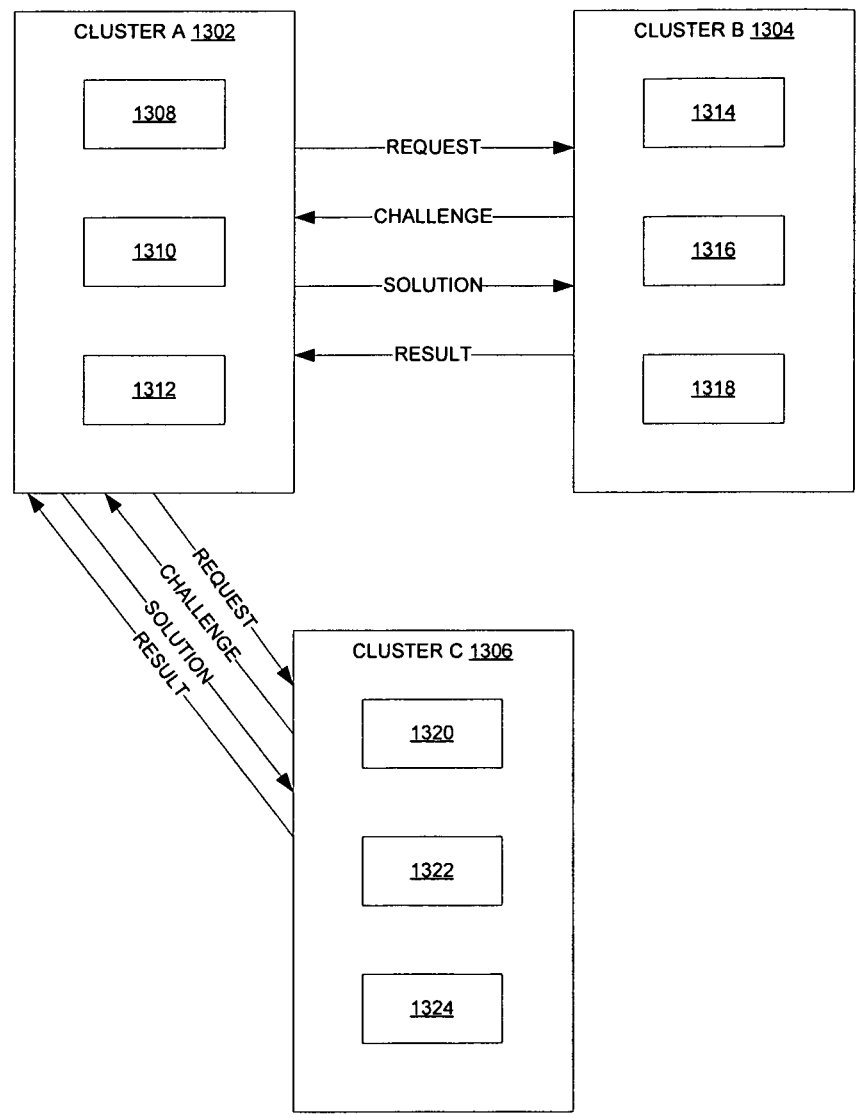
FIG. 13 is a block diagram of one embodiment of a peer-to-peer stateless challenge-response protocol.

FIG. 13 is a block diagram of one embodiment of a peer-to-peer stateless challenge protocol system where a cluster of system can act alternatively as clients and servers from time to time. Group A 1302 includes one or more systems 1308, 1310, 1312. Group B 1304 includes one or more servers 1314, 1316, 1318. When a system in group A 1302 broadcasts a request to group B 1304, the systems in group A 1302 act as clients, and the systems in group B 1304 act as servers. As such, the interaction describes above applies between group A 1302 and group B 1304. A system in group A 1302 broadcasts a request to group B 1304. Any system from group B 1304 transmits a challenge that includes the request to group 1302. Any system from group A 1302 may reply to the challenge. Any system from group B 1304 may may verify the solution and act on the request. In the meantime, a system in group C 1306 broadcasts a request to group A 1302. A system in group A 1302 issues a challenge. In this particular interaction, the system in group A 1302 acts as a server.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   broadcasting a request to a server group from a client of a client group using a stateless challenge-response protocol, wherein the stateless challenge-response protocol accumulates state information relating to interaction between the client and the server group;

receiving a tamper-evident challenge from any one server of the server group at any one client of the client group, wherein the tamper-evident challenge comprises the request and an encrypted nonce that can be solved by an entity holding a secret key, and wherein the entire tamper-evident challenge is embedded in a tamper-resistant structure using a second secret key known to any one of the server group to allow the any one of the server group to detect any attempt by the client to circumvent the tamper-evident challenge;

verifying the tamper-evident challenge to ensure that the request received in the tamper-evident challenge correctly describes the request to the server group;

decrypting the encrypted nonce of the tamper-evident challenge to obtain a solution;

broadcasting a response with a solution to the tamper-evident challenge to any one server of the server group, the response including the request; and receiving a result to the request upon any one server of the server group verifying the response being valid and the request being unmodified.

2. The computer-implemented method of claim 1 wherein the request includes a public parameter to generate a shared secret with any one server of the server group.

3. The computer-implemented method of claim 2 wherein the tamper-evident challenge includes data encrypted by the secret key shared with any one client of the client group.

4. The computer-implemented method of claim 1 further comprising broadcasting the response to the tamper-evident challenge from any one client of the client group.

5. A computer-implemented method comprising:

receiving a broadcast request from a client of a client group at a server of a server group using a stateless challenge-response protocol, wherein the stateless challenge-response protocol accumulates state information relating to interaction between the client and the server group;

transmitting a tamper-evident challenge to any one client of the client group, wherein the tamper-evident challenge comprises the broadcast request and an encrypted nonce that can be solved by an entity holding a secret key, and wherein the entire tamper-evident challenge is embedded in a tamper-resistant structure using a second secret key known to any one of the server group to allow the any one of the server group to detect any attempt by the client to circumvent the tamper-evident challenge;

receiving a broadcast response to the tamper-evident challenge at any one server of the server group, the broadcast response including the broadcast request;

verifying the broadcast response; and performing the broadcast request upon any one server of the server group verifying the response being valid and the broadcast request being unmodified.

6. The computer-implemented method of claim 5 wherein the request includes a public parameter to generate a shared secret with any one server of the server group.

7. The computer-implemented method of claim 6 wherein the tamper-evident challenge includes data encrypted by the secret key shared with any one client of the client group.

8. The computer-implemented method of claim 5 further comprising verifying the response to the tamper-evident challenge at any one server of the server group.

9. A computing system, comprising:
a data storage device; and
a processing device coupled to the data storage device, wherein the processing device is configured to execute a client comprising:
  a transmitter configured to broadcast a request to a server group from the client of a client group using a stateless challenge-response protocol, wherein the stateless challenge-response protocol accumulates state information relating to interaction between the client and the server group;
  a request verifier coupled to the transmitter, the request verifier configured to receive a tamper-evident challenge from any one server of the server group at any one client of the client group, wherein the tamper-evident challenge comprises the request and an encrypted nonce that can be solved by an entity holding a secret key, wherein the entire tamper-evident challenge is embedded in a tamper-resistant structure using a second secret key known to any one of the server group to allow the any one of the server group to detect any attempt by the client to circumvent the tamper-evident challenge, and wherein the request verifier is configured to verify the tamper-evident challenge to ensure that the request received in the tamper-evident challenge correctly describes the request to the server group and to decrypt the encrypted nonce of the tamper-evident challenge to obtain a solution;
  a solution generator coupled to the request verifier, the solution generator to broadcast a response with the solution to the tamper-evident challenge to any one server of the server group, the response including the request; and
  a public parameter database coupled to the transmitter, the public parameter comprising one or more public parameters shared with the client group and the server group,
  wherein the client is to receive a result to the request upon any one server of the server group verifying the response being valid and the request being unmodified.

10. The computing system of claim 9 wherein the request includes a public parameter from the public parameter database to generate a shared secret with any one server of the server group.

11. The computing system of claim 10 wherein the tamper-evident challenge includes data encrypted by the secret key shared with any one client of the client group.

12. A computing system, comprising:
a data storage device; and
a processing device coupled to the data storage device, wherein the processing device is configured to execute a server comprising:
  a challenge generator configured to receive a broadcast request from a client of a client group at the server of a server group using a stateless challenge-response protocol, wherein the stateless challenge-response protocol accumulates state information relating to interaction between the client and the server group, and to generate a tamper-evident challenge to any one client of the client group, wherein the tamper-evident challenge comprises the request and an encrypted nonce that can be solved by an entity holding a secret key, and wherein the entire tamper-evident challenge is embedded in a tamper-resistant structure using a second secret key known to any one of the server group to allow the any one of the server group to detect any attempt by the client to circumvent the tamper-evident challenge;
a challenge verifier coupled to the challenge generator, the challenge verifier configured to receive a broadcast response to the tamper-evident challenge, the broadcast response including the broadcast request, and to verify the broadcast response;
a request executor coupled to the solution verifier, the request executor configured to perform the broadcast request upon any one server of the server group verifying the broadcast response being valid and the broadcast request being unmodified; and
a public parameter database coupled to the challenge generator, the public parameter comprising one or more public parameters shared with the client group and the server group.

13. The computing system of claim 12 wherein the request includes a public parameter from the public parameter database to generate a shared secret with any one server of the server group.

14. The computing system of claim 13 wherein the tamper-evident challenge includes data encrypted by the secret key shared with any one client of the client group.

15. A non-transitory computer-accessible storage medium including data that, when accessed by a computer, cause the computer to perform a method comprising:
broadcasting a request to a server group from a client of a client group using a stateless challenge-response protocol, wherein the stateless challenge-response protocol accumulates state information relating to interaction between the client and the server group;
receiving a tamper-evident challenge from any one server of the server group at any one client of the client group, wherein the tamper-evident challenge comprises the request and an encrypted nonce that can be solved by an entity holding a secret key, and wherein the entire tamper-evident challenge is embedded in a tamper-resistant structure using a second secret key known to any one of the server group to allow the any one of the server group to detect any attempt by the client to circumvent the tamper-evident challenge;
verifying the tamper-evident challenge to ensure that the request received in the tamper-evident challenge correctly describes the request to the server group;
decrypting the encrypted nonce of the tamper-evident challenge to obtain a solution;
broadcasting a response with a solution to the tamper-evident challenge to any one server of the server group, the response including the request; and
receiving a result to the request upon any one server of the server group verifying the response being valid and the request being unmodified.

16. The computer-accessible storage medium of claim 15 wherein the request includes a public parameter to generate a shared secret with any one server of the server group.

17. The computer-accessible storage medium of claim 16 wherein the tamper-evident challenge includes data encrypted by the secret key shared with any one client of the client group.

18. A non-transitory computer-accessible storage medium including data that, when accessed by a computer, cause the computer to perform a method comprising:
receiving a broadcast request from a client of a client group at a server of a server group using a stateless challenge-response protocol, wherein the stateless challenge-response protocol accumulates state information relating to interaction between the client and the server group;
transmitting a tamper-evident challenge to any one client of the client group, wherein the tamper-evident challenge comprises the broadcast request and an encrypted nonce that can be solved by an entity holding a secret key, and wherein the entire tamper-evident challenge is embedded in a tamper-resistant structure using a second secret key known to any one of the server group to allow the any one of the server group to detect any attempt by the client to circumvent the tamper-evident challenge;
receiving a broadcast response to the tamper-evident challenge at any one server of the server group, the broadcast response including the broadcast request;
verifying the broadcast response; and
performing the broadcast request upon any one server of the server group verifying the response being valid and the broadcast request being unmodified.

19. The computer-accessible storage medium of claim 18 wherein the request includes a public parameter to generate a shared secret with any one server of the server group.

20. The computer-accessible storage medium of claim 19 wherein the tamper-evident challenge includes data encrypted by the secret key shared with any one client of the client group.

* * * * *